US010060754B2

(12) United States Patent
Aben et al.

(10) Patent No.: US 10,060,754 B2
(45) Date of Patent: Aug. 28, 2018

(54) NAVIGATION DEVICE AND METHOD

(75) Inventors: Sjoerd Aben, Alkmaar (NL); Michel Alders, Amsterdam (NL)

(73) Assignee: TOMTOM NAVIGATION B.V., Amsterdam (NL)

( * ) Notice: Subject to any disclaimer, the term of this patent is extended or adjusted under 35 U.S.C. 154(b) by 200 days.

(21) Appl. No.: 13/508,077

(22) PCT Filed: Jun. 23, 2010

(86) PCT No.: PCT/EP2010/058932
§ 371 (c)(1),
(2), (4) Date: May 4, 2012

(87) PCT Pub. No.: WO2011/054550
PCT Pub. Date: May 12, 2011

(65) Prior Publication Data
US 2012/0221247 A1    Aug. 30, 2012

Related U.S. Application Data

(60) Provisional application No. 61/257,873, filed on Nov. 4, 2009.

(51) Int. Cl.
G01C 21/34        (2006.01)
G01C 21/36        (2006.01)
G09B 29/00        (2006.01)
G09B 29/10        (2006.01)

(52) U.S. Cl.
CPC ......... *G01C 21/36* (2013.01); *G01C 21/3691* (2013.01); *G09B 29/004* (2013.01); *G09B 29/10* (2013.01)

(58) Field of Classification Search
CPC ............ G01C 21/3492; G01C 21/3415; G01C 21/3691
See application file for complete search history.

(56) References Cited

U.S. PATENT DOCUMENTS

| 6,151,550 | A  | * | 11/2000 | Nakatani ........................ 701/117 |
| 6,163,696 | A  | * | 12/2000 | Bi et al. ........................ 455/436 |
| 6,216,085 | B1 | * | 4/2001  | Emmerink et al. ............ 701/117 |
| 6,636,801 | B2 | * | 10/2003 | Curbow ........................ 701/516 |
| 8,065,072 | B2 |   | 11/2011 | Yoshioka et al. |
| 8,498,804 | B2 | * | 7/2013  | Geelen et al. ........... 342/357.74 |

(Continued)

FOREIGN PATENT DOCUMENTS

CN       1967150 A      5/2007
CN     101086804 A     12/2007
(Continued)

OTHER PUBLICATIONS

International Search Report dated Oct. 14, 2010 for International Application No. PCT/EP2010/058932.

*Primary Examiner* — Ryan Rink

(57) ABSTRACT

Embodiments of the present invention relate to a device including a module (490) which is operative in a low-power state of the device (200). The module (490) is arranged to determine whether a traffic situation on a route has more than a predetermined affect on the route, and to cause the navigation device (200) to output a notification in response thereto which alerts the user of the device to the traffic situation despite the device being in the low-power state.

14 Claims, 6 Drawing Sheets

(56) References Cited

U.S. PATENT DOCUMENTS

| | | | |
|---|---|---|---|
| 2002/0156571 A1 | 10/2002 | Curbow | |
| 2004/0243533 A1* | 12/2004 | Dempster | G06F 17/30241 |
| 2006/0212213 A1 | 9/2006 | Piekarz | |
| 2007/0149214 A1* | 6/2007 | Walsh | H04L 12/1859 |
| | | | 455/456.1 |
| 2007/0185644 A1 | 8/2007 | Hirose | |
| 2008/0167797 A1* | 7/2008 | Geelen et al. | 701/200 |
| 2008/0195313 A1* | 8/2008 | Coleman | 701/210 |
| 2008/0294330 A1 | 11/2008 | Sasano | |
| 2009/0005964 A1* | 1/2009 | Forstall et al. | 701/201 |
| 2009/0105940 A1 | 4/2009 | Bitan | |
| 2009/0105947 A1 | 4/2009 | Nachesa et al. | |
| 2009/0164115 A1* | 6/2009 | Kosakowski et al. | 701/201 |
| 2009/0281721 A1 | 11/2009 | Yoshioka et al. | |
| 2009/0287401 A1* | 11/2009 | Levine et al. | 701/117 |
| 2011/0054775 A1* | 3/2011 | Snyder | G01C 21/3655 |
| | | | 701/533 |

FOREIGN PATENT DOCUMENTS

| | | | |
|---|---|---|---|
| CN | 101331383 A | 12/2008 | |
| JP | 2000031850 A | 1/2000 | |
| JP | 2000266562 A | 9/2000 | |
| JP | 2008070174 A | 3/2008 | |
| JP | 2009063587 A | 3/2009 | |
| JP | 2009533693 A | 9/2009 | |
| WO | 2004034725 A1 | 4/2004 | |
| WO | 2009104244 A1 | 8/2009 | |

* cited by examiner

NAVIGATION DEVICE AND METHOD

CROSS-REFERENCES TO RELATED APPLICATIONS

This application is the National Stage of International Application No. PCT/EP2010/058932, filed Jun. 23, 2010 and designating the United States. The entire content of this application is incorporated herein by reference. The present application hereby claims priority from U.S. Provisional Patent Application No. 61/257,873 filed Nov. 4, 2009; the entire content of which is incorporated herein by reference.

FIELD OF THE INVENTION

This invention relates to navigation devices and to methods for providing traffic information. Illustrative embodiments of the invention relate to portable navigation devices (so-called PNDs), in particular PNDs that include Global Positioning System (GPS) signal reception and processing functionality. Other embodiments relate, more generally, to any type of processing device that is configured to execute navigation software so as to provide route planning, and preferably also navigation, functionality.

BACKGROUND TO THE INVENTION

Portable navigation devices (PNDs) that include GPS (Global Positioning System) signal reception and processing functionality are well known and are widely employed as in-car or other vehicle navigation systems.

In general terms, a modern PNDs comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favorite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the 720T model manufactured and supplied by TomTom International B.V., provide a reliable means for enabling users to navigate from one position to another.

A problem has been noted in that users often only utilise their navigation device when travelling an unfamiliar route i.e. to provide route guidance. Some users user their navigation devices in the "free-driving" mode mentioned above, however this is often only in the case where the destination is a long distance away and they are familiar with the route. It has been noted that, in particular, user do not often use a navigation device when travelling relatively short familiar routes, such as those to a place of work. However, a problem arises in that users can still be delayed on known routes by traffic.

It is an aim of the present invention to solve or at least alleviate one or more of the problems with the prior art.

SUMMARY OF THE INVENTION

Embodiments of the present invention relate to a device including a module which is operative in a low-power state of the device. The module is arranged to determine whether a traffic situation on a route has more than a predetermined affect on the route, and to cause the navigation device to output a notification in response thereto which alerts the user of the device to the traffic situation despite the device being in the low-power state.

In pursuit of this aim, a presently preferred embodiment of the present invention provides a navigation device, comprising a module operative in a low-power state of the navigation device, to determine whether a traffic situation of a route has more than a predetermined affect on the route and to cause the navigation device to output a notification in response thereto.

A further preferred embodiment of the invention provides a method of alerting a user of a navigation device to a traffic situation on a route by determining, whilst a navigation device is in a low-power state, whether the user is travelling a known route; determining whether a traffic situation on the route has more than a predetermined affect on the route and, in response, outputting a notification to the user.

Yet another embodiment of the present invention relates to computer software comprising one or more software modules operable, when executed in an execution environment, to cause a processor to alert a user of a navigation device to a traffic situation on a route by determining, whilst a navigation device is in a low-power state, whether the user is travelling a known route; determining whether a traffic situation on the route has more than a predetermined affect on the route and, in response, outputting a notification to the user.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

Figure 1:
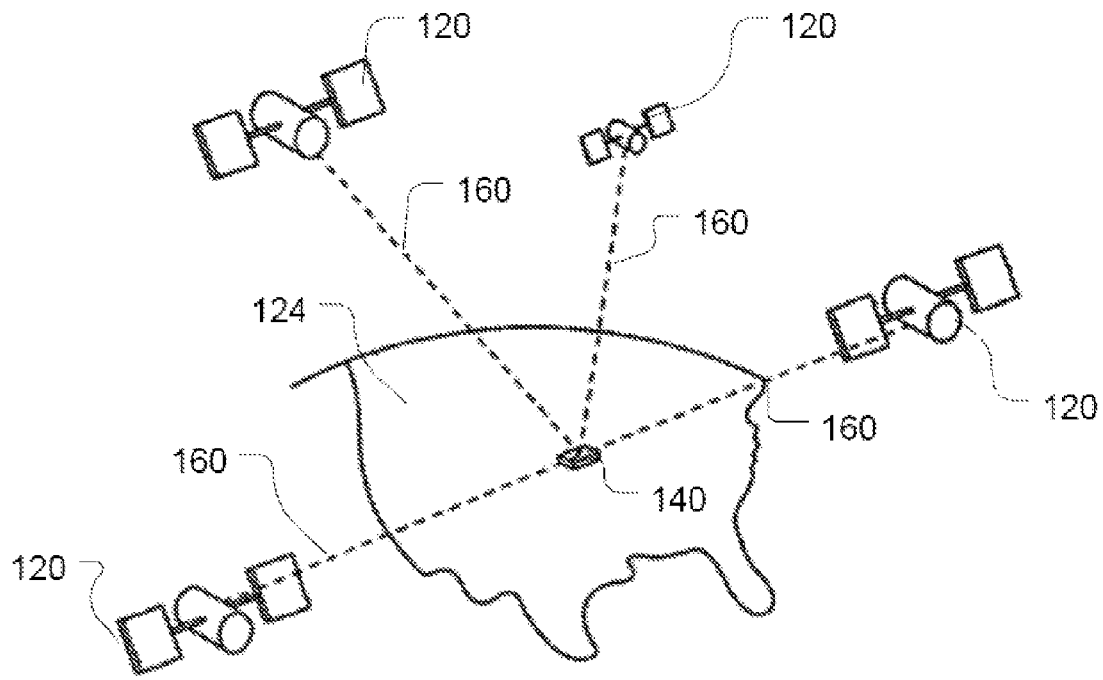
FIG. 1 is a schematic illustration of a Global Positioning System (GPS)

FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
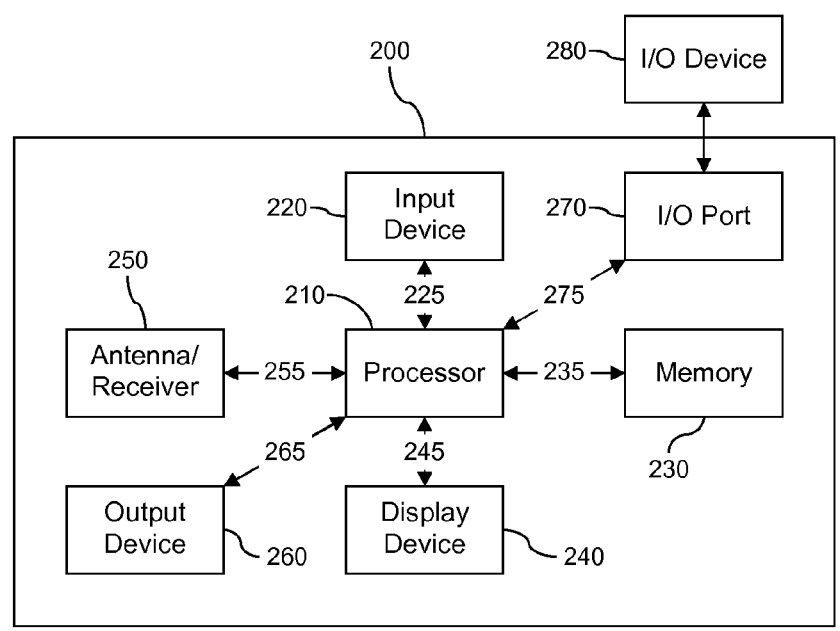
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectible to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
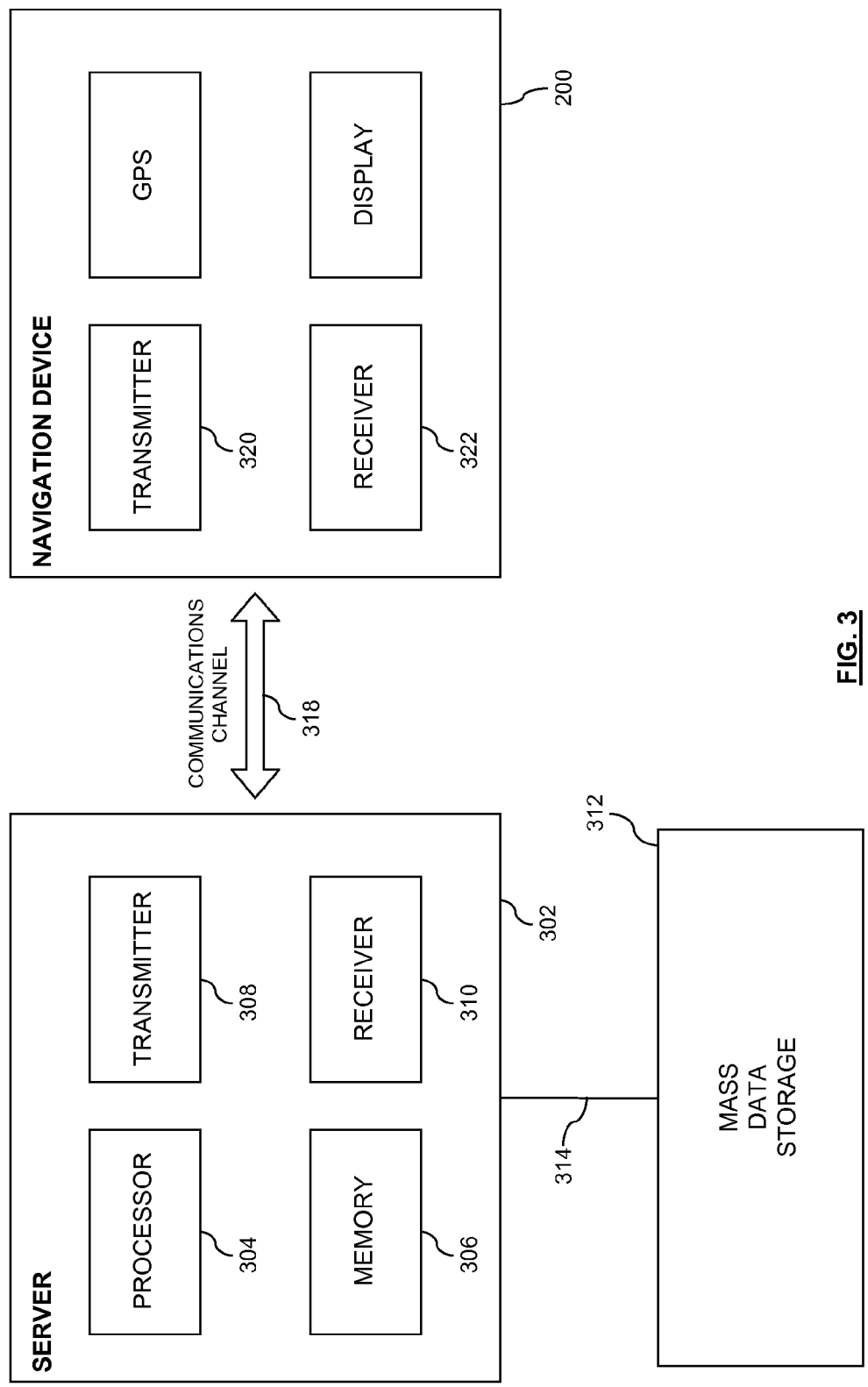
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4A:
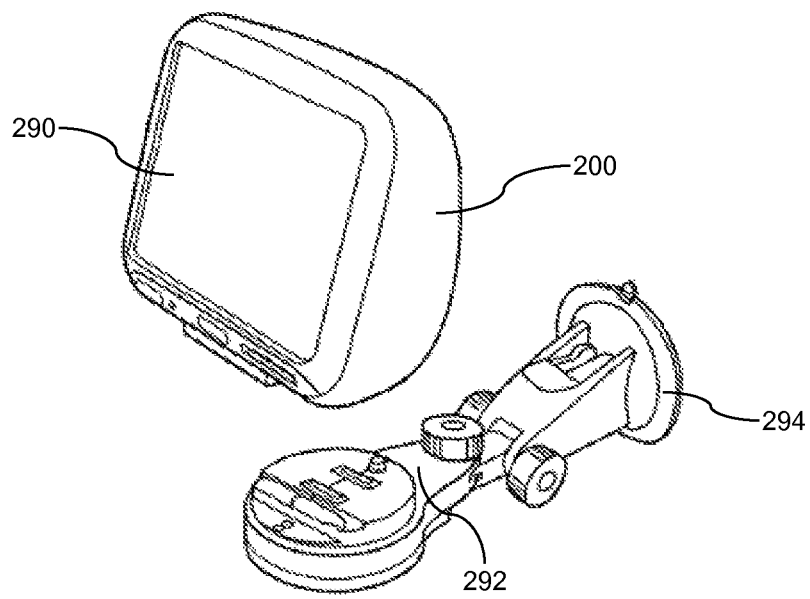
FIGS. 4A and 4B are illustrative perspective views of a navigation device.
Figure 4B:
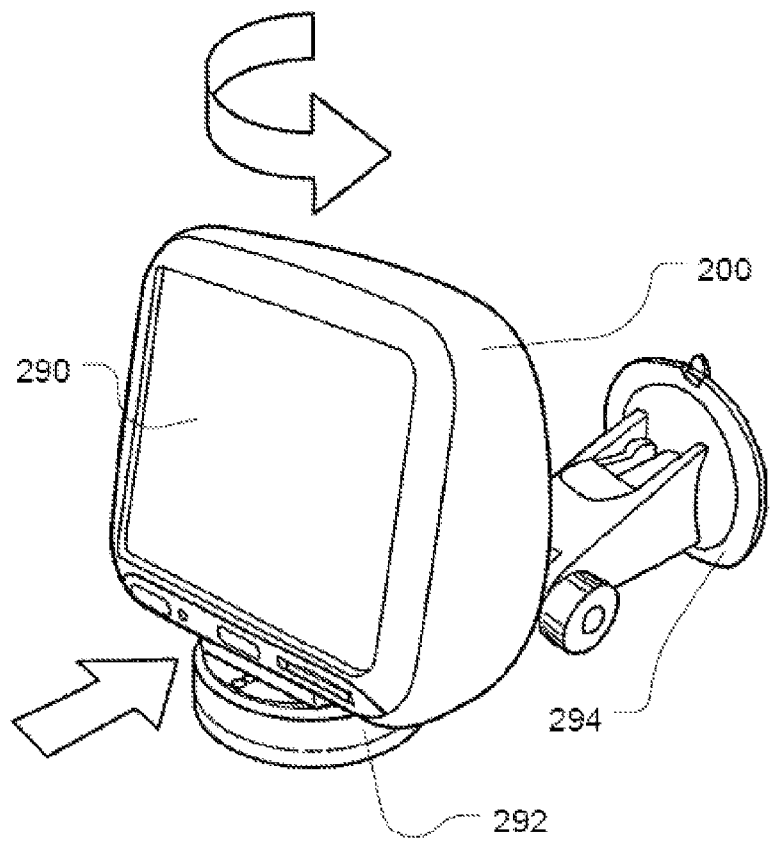

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 4B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Figure 5:
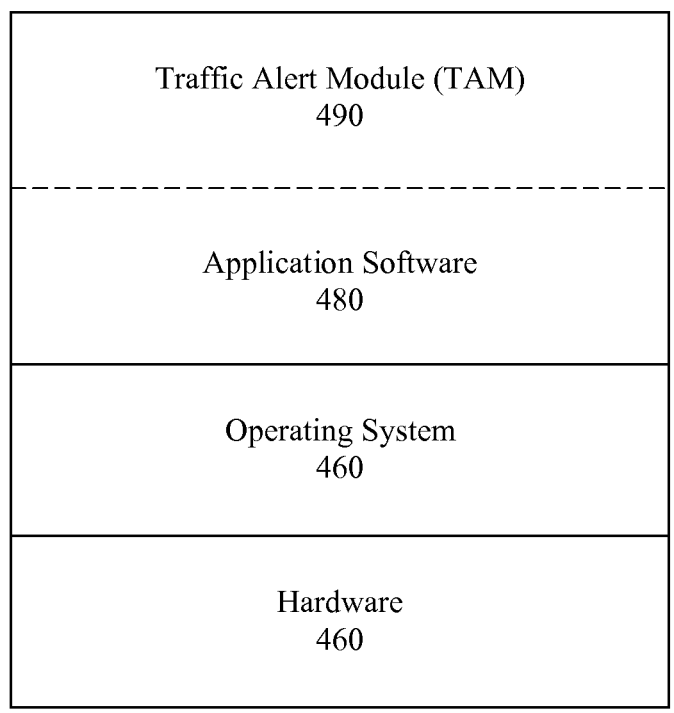
FIG. 5 is a schematic representation of the software employed by the navigation device.

Referring now to FIG. 5 of the accompanying drawings, the memory resource 230 stores a boot loader program (not shown) that is executed by the processor 210 in order to load an operating system 470 from the memory resource 230 for execution by functional hardware components 460, which provides an environment in which application software 480 can run. The operating system 470 serves to control the functional hardware components 460 and resides between the application software 480 and the functional hardware components 460. The application software 480 provides an operational environment including the GUI that supports core functions of the navigation device 200, for example map viewing, route planning, navigation functions and any other functions associated therewith. In accordance with the preferred embodiment of the present invention, part of this functionality comprises a traffic alert module (TAM) 490, the function of which will now be described in detail in connection with the following figures.

The TAM 490 is operative even when the navigation device 200 is in a low power state, such as when the display device 240 is non-operational. For example, when the navigation device 200 has been placed in an "off" state the TAM 490 is still operative to perform one or more functions, as described below. The low-power states may be a user-activated "off" state in which a majority of functions of the navigation device 200 are disabled and/or a power-saving state of the navigation device wherein high-power consuming sub-systems or devices such as display screen 240 are disabled. It will be realised that the TAM 490 may also be operational in an operative or "on" state of the navigation device 200.

Figure 6:
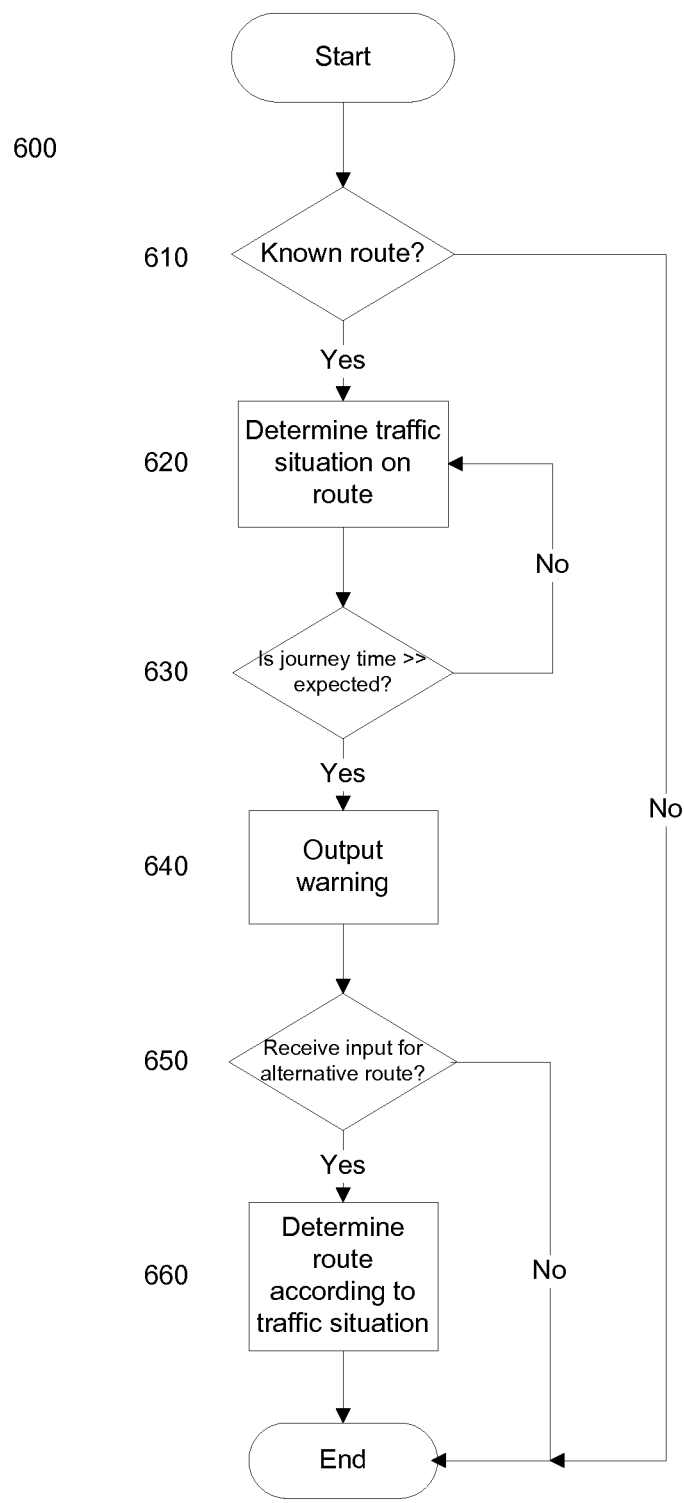
FIG. 6 is a flow chart illustrating a method according to an embodiment of the invention.

FIG. 6 illustrates a method 600 according to an embodiment of the invention. The method is performed by the TAM 490. The method 490 may be performed when the TAM 490 is the low-power state, for example whilst in the case of a PND placed inside a carrying bag or other enclosure such as a glove-box of a vehicle. At such times, the navigation device 200 may not be able to receive GPS signals to accurately determine the location of the navigation device 200 and consequently the route being followed by the user. However, other forms of location determining technique may be used by the TAM 490 to ascertain the location of the navigation device even if those techniques have a lower accuracy than based on GPS signals, and to determine the route being taken by the user. A method of route determination will be explained below with reference to FIG. 8.

Referring to FIG. 6, the method starts and in step 610 the TAM 490 determines whether the user is travelling a known route for which an expected journey time may be calculated. The determination of route in step 610 may be performed with reference to received GPS signals, if possible, and/or other wirelessly received landmarks, such as wireless networks e.g. Wi-Fi and/or telecommunication networks such as GSM or UMTS. The TAM 490 may also utilise a store containing information identifying one or more routes previously travelled by the navigation device 200. The store may be held within the navigation device 200, such as in memory 230, and/or accessible to the navigation device 200 such as via communications channel 318 on server 302.

If in step 610 the TAM 490 determines that the navigation device 200 is travelling along a known route then the method may move to step 620. However, if the TAM 490 determines that the route is not known, then the method may end.

In some embodiments of step 610 a first estimated journey time for the route is determined in step 610, although in other embodiments this is performed in step 630. The first estimated journey time may be a theoretical journey time calculated according to expected travelling speeds for each road section forming the route. Alternatively the journey time may be based upon historic journey information. The historic journey information may be indicative of a previous travelling speed or time of the navigation device 200 i.e. the user's personal journey information, a plurality of navigation devices 200 i.e. users of other navigation devices 200 or a combination of personal and other user's journey information. Such historic journey information is provided as IQ Routes by TomTom International BV. The first estimated journey time does not include an indication of traffic conditions along the route.

In step 620 the TAM 490 determines a second estimated journey time for the route, wherein the second estimated journey time includes considerations of traffic conditions along the route. Traffic conditions may include delays due to the vehicular conditions e.g. accidents, a volume of traffic and the like, and also to other conditions such as weather-induced delays.

To determine the second estimated journey time, the TAM 490 utilises traffic information from one or more sources. The traffic information may also be received whilst the navigation device 200 is in the low-power mode. However, the traffic information may alternatively be that received whilst the navigation device 200 was last in the "on" or operational mode. The traffic information may indicate observed traffic speeds on one or more road segments. For example, the traffic information may indicate that traffic travelling on a particular road segment has an observed speed of 20 $kmh^{-1}$. In contrast, the expected road speed based on the type of road and any other associated information may indicate an expected road speed of 45 $kmh^{-1}$ for that road segment. Thus, due to the traffic situation, there is a deviation of 25 $kmh^{-1}$ for that road segment which will increase the journey time for the user according to the length of the road segment. From the received traffic information, the second estimated journey time is determined by the TAM 490 for the route. The second estimated journey time is influenced by the traffic situation along the route and thus provides a more realistic estimated journey time for the route being travelled.

In step 630 the first and second estimated journey times are compared by the TAM 490. The TAM 490 determines whether the second estimated journey time differs from the first journey time by more than a predetermined margin. The margin may be a time margin i.e. X minutes, or may be a relative percentage i.e. X %. For example, it may be determined in step 630 whether the second journey time is more than a predetermined time greater than the first journey time. The predetermined time may be 5 minutes, although other time periods may be used such as 2, 4, 6 or 8 minutes. If it is determined that the second expected journey time is more than the first expected journey by the predetermined margin, then the method moves to step 640. However, if the first and second journey times differ by less than the predetermined margin, the method returns to step 620. A subsequent repetition of step 620 may be performed after a predetermined period of time, rather than substantially instantaneously. For example, an updated second expected journey time may be determined after 2, 4 or 5 minutes, for example.

In step 640 an indication of the second expected journey time due to traffic exceeding the first expected journey time is output to the user. The indication may be a warning that the user's journey is likely to take longer than normal, i.e. most cases, due to the current traffic situation. The warning may be visual, audible or a combination of both. It is preferable that the warning at least includes an audible part due to the possibility that the navigation device 200 is within an enclosure, such as a bag or glove box of a vehicle. The audible output may include a spoken warning providing an indication that the second expected journey time is greater than the first journey time. The spoken warning may include a spoken indication of the difference between the first and second expected journey times, for example in the form of "Warning, the delay due to traffic is X minutes".

Furthermore, in some embodiments the navigation device 200 may already, for example in step 630, have determined that an alternative route is available according to the current traffic situation which is quicker than current route having the second expected journey time according to the traffic situation.

In some embodiments of the method, in step 650 there is provided a means for the user to provide an input to the navigation device 200 indicative of either the user's desire for the navigation device 200 to determine if an alternative route is available, or to accept the alternative route if already calculated by the navigation device 200. The means may be a graphical control displayed on the display device 240 which is activatable by the user to cause the navigation device 200 to either determine another route or to accept a previously determined route, if one is available. Alternatively, the means may be a physical switch which causes the navigation device 200 to enter a higher-power state, such as fully operational, where the navigation device 200 may display on the display device 240 an indication that an alternative route is available or determine if an alternative route is available. If in step 650 the user inputs an indication that an alternative route is desired, then in step 660 the navigation device 600 determines a best route according to one or more criteria and the current traffic situation as indicated by the traffic information. The best route may be the route having the shortest journey time taking into account the traffic information. If, however, in step 650, the user does not provide an indication that an alternative route is desired then the method ends. The user may indicate that an alternative route is not desired by, for example, not providing any input to the navigation device 200, or may activate a graphic control indicating that the user is happy to proceed on the current route, even bearing in mind the traffic situation. In the case that the user does not provide any input in step 650 indicative that an alternative route is desired, the TAM 490 may cease to output at least part of the notification output in step 640. For example the TAM 490 may cease to output an audible part of the output or both the audible and visual parts of the output, after a predetermined time to avoid distracting the user.

It will be realised from the explanation provided with reference to FIG. 6 that, rather than comparing journey times, estimated journey speeds may be compared and the determination of whether to output a warning based on the compared expected journey speeds.

Figure 7:
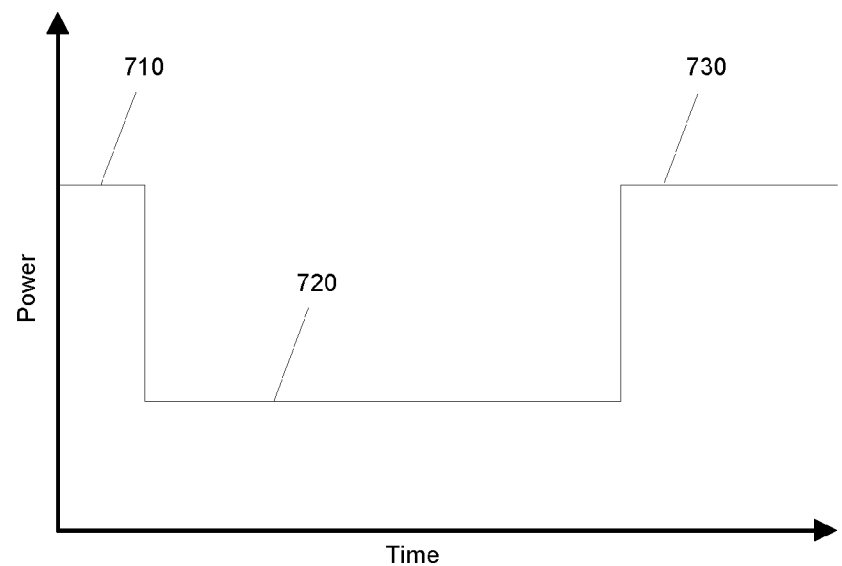
FIG. 7 is a schematic diagram illustrating operational states of the navigation device according to an embodiment of the invention.

FIG. 7 illustrates operational states of the navigation device 200 against time according to an embodiment of the invention. At time 710 the navigation device 200 is powered-on i.e. is fully operational. At the end of period 710, the user presses an off-switch on the navigation device 200 which causes the device to enter a low-power state i.e. a sleep state in which one or more internal modules are at least partly operational, including the TAM 490. The low power state is indicated with numeral 720. Whilst in the low-power state the TAM 490 may perform steps 610-630 as shown in FIG. 6 and described above. That is, whilst in the low-power state the TAM 490 may determine whether the navigation device 200 is being transported by the user along a known route for which the first expected journey time may be determined, the TAM may further determine a second expected journey time according to received traffic information and determine whether the first and second expected journey times differ by more than a predetermined margin. In some embodiments, when the TAM 490 determines that the first and second expect journey times differ by more than the predetermined margin, the TAM 490 causes the navigation device to enter a higher-power state, such as the on-state indicated by reference numeral 730 in FIG. 7. Once in the higher-power state 730 the TAM 490 may output the warning to notify the user of the traffic situation. It will be appreciated that should no further input be received from the user, the TAM 490 may cause the navigation device 200 to re-enter the low power state 720 after a predetermined period of time, or if an input corresponding to the low-power state i.e. activation of the off switch is received from the user.

Figure 8:
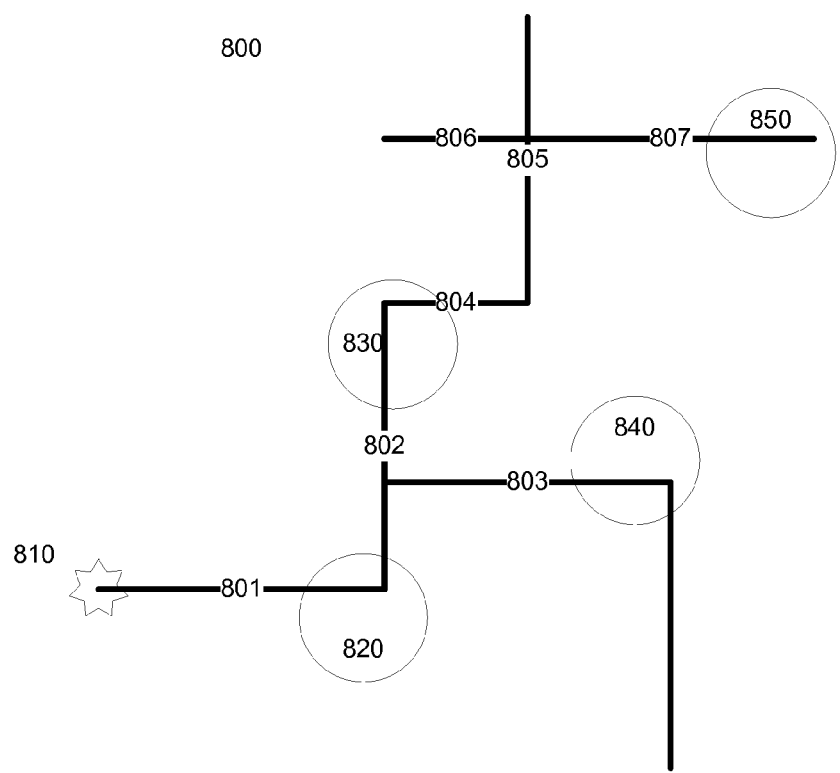
FIG. 8 is a schematic diagram illustrating operation of a navigation device according to an embodiment of the invention.

FIG. 8 illustrates a method according to an embodiment of the invention by which the TAM 490 may determine whether the user is following a known route without receipt of GPS signals. In this embodiment, the TAM 490 determines whether a known route is being followed with reference to other wirelessly received signals. The received signals may be short-range communication signals. In the illustrated embodiment, the short-range signals are wireless network signals, although it will be realised that other short-range signals may be utilised.

FIG. 8 illustrates a geographical area 800 including a plurality of road segments 801-807. A current location of a navigation device 200 is indicated with reference numeral 810. A plurality of locations at which respective short-range wireless networks, such as Wi-Fi, may be received whilst travelling along adjacent road segments are indicated with reference numerals 820, 830, 840, 850. Each wireless network 820, 830, 840, 850 may be distinguished by identification information associated with the wireless network. On one or more previous journeys during which the navigation device 200 was able to receive GPS signals, the TAM 490 recorded information indicating that one or more of the wireless networks had been received whilst travelling on the adjacent road segment whilst travelling an associated route. The TAM 490 may store information associating the route, road segment and wireless network identification information in a database such that in step 610 of the method 600 described above the route may be determined according to a sequence of received wireless networks. Thus, the route being followed by the user may be determined by the TAM 490 receiving signals from one or more of the wireless networks 820-850 and comparing the order in which identification information associated with the wireless networks is received against the stored information. For example, the navigation device proceeds along road segment 801. Approximately at the junction or transition point to road segment 802, the TAM 490 is arranged to identify that wireless network 820 is received. At a point later in time the TAM 490 receives signals from wireless network 830. The TAM 490 is therefore able to determine that the use has not proceeded along road 803; otherwise wireless network 840 would have been received by TAM 490. Still later, the TAM 490 receives signals from wireless network 850. From the combination of received wireless network signals from network 820, 830, 850, the TAM 490 determines that the route being followed includes road segments 801, 802, 804, 805, 807 by comparing the determined sequence of wireless networks received against those stored in a database accessible to the TAM 490 e.g. stored in memory 230. The TAM 490 may, for example, determine that the route corresponds to the route to the user's place of work.

Other embodiments of the TAM 490 may alternatively or additionally determine the route being followed with reference to other received signals, such as by triangulation of received mobile telephone i.e. GSM or UMTS signals.

It will be apparent from the foregoing that the teachings of the present invention provide an arrangement whereby a navigation device is arranged to automatically determine if a traffic situation is likely to unduly influence a user's journey time, even when the navigation device is not fully operation and/or has not been informed i.e. programmed with the user's destination.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A device for providing traffic information, comprising: a module arranged to:
    while the device remains in a low-power state, wherein the low-power state is a user-activated off state or power-saving state for the device, wherein, in the low-power state, a display of the device and one or more sub-systems of the device are disabled:
    monitor a travel route for the device;
    determine that the device is travelling a known route based on a store of previously travelled routes;
    determine a first estimated travel time for the route based on historical travel information for the device on the route;
    acquire, whilst in the low-power state, traffic information indicating a present traffic situation for the route, the traffic information including information about present speeds on one or more road segments of the route;
    determine, by the module, a second estimated travel time for the route based on expected speeds for each road section forming the route as adjusted based on the present traffic situation for the route;
    determine that a difference between the first estimated travel time and the second estimated travel time exceeds a threshold; and
    upon determining that difference exceeds the threshold, cause the device to output a notification.

2. The device of claim 1, wherein the module is arranged to determine the route according to received communications signals, wherein the received communications signals include at least one of wireless networks and telecommunications signals.

3. The device of claim 2, wherein the module is arranged to determine the route according to a sequence of received wireless network signals and a store containing wireless network information associated with one or more routes; or to determine the route based on location estimates based on received telecommunications signals and the store.

4. The device of claim 1, wherein the module is arranged to output the notification audibly to alert a user to the traffic situation on the route.

5. The device of claim 1, wherein the module is arranged to determine whether an alternative route is available which is less affected by the traffic situation and to output an indication that the alternative route is available.

6. A method of alerting a user of a device for providing traffic information to a traffic situation on a route, comprising:
    while the device remains in a low-power state, wherein the low-power state is a user-activated off state or power-saving state for the device, wherein, in the low-power state, a display of the device and one or more sub-systems of the device are disabled:
    monitoring a travel route for the device;
    determining that the device is travelling a known route based on a store of previously travelled routes;
    determining a first estimated travel time for the route based on historical travel information for the device on the route;
    acquire, whilst in the low-power state, traffic information indicating a present traffic situation for the route, the traffic information including information about present speeds on one or more road segments of the route;
    determining a second estimated travel time for the route based on expected speeds for each road section forming the route as adjusted based on the present traffic situation for the route;
    determining that a difference between the first estimated travel time and the second estimated travel time exceeds a threshold; and
    upon determining that difference exceeds the threshold, causing the device to output a notification.

7. The method of claim 6, comprising causing the device to enter a higher-power state prior to outputting the notification.

8. The method of claim 6, comprising: receiving wireless communication signals; and
    determining whether the user is travelling a known route based on the communication signals and a store containing information associating the communication signals with one or more routes.

9. The method of claim 8, wherein when the wireless communication signals are wireless network signals, comparing a sequence of the received wireless communication signals against wireless network information in the store, and when the wireless communication signals are telecommunication signals, determining estimated locations from the telecommunication signals and comparing the locations against the store.

10. The method of claim 6, comprising: determining whether an alternative route less affected by the traffic situation is available and outputting a notification to the user indicating the availability of the alternative route.

11. The device of claim 1, wherein the device enters a higher-power state prior to the output of the notification.

12. The device of claim 11, wherein the device re-enters the low-power state after a predetermined time period after the output of the notification.

13. A non-transitory computer-readable medium which stores a set of instructions which when executed performs a method of alerting a user of a device for providing traffic information to a traffic situation on a route, the method executed by the set of instructions comprising:
    while the device remains in a low-power state, wherein the low-power state is a user-activated off state or power-saving state for the device, wherein, in the low-power state, a display of the device and one or more sub-systems of the device are disabled:
    monitor a travel route for the device;
    determine that the device is travelling a known route based on a store of previously travelled routes;
    determine a first estimated travel time for the route based on historical travel information for the device on the route;
    acquire, whilst in the low-power state, traffic information indicating a present traffic situation for the route, the traffic information including information about present speeds on one or more road segments of the route;
    determine a second estimated travel time for the route based on expected speeds for each road section forming the route as adjusted based on the present traffic situation for the route;
    determine that a difference between the first estimated travel time and the second estimated travel time exceeds a threshold; and
    upon determining that difference exceeds the threshold, cause the device to output a notification.

14. The device of claim 1, wherein the determination of whether the device is travelling a known route occurs without a reception of Global Positioning Satellite (GPS) signals.

* * * * *